United States Patent [19]

Kawasaki et al.

[11] Patent Number: 4,796,035
[45] Date of Patent: Jan. 3, 1989

[54] IMAGE RECORDING APPARATUS WITH IMPROVED SYSTEM FOR FEEDING AND EXHAUSTING RECORDING SHEETS

[75] Inventors: Keiichi Kawasaki, Tokyo; Kazuhisa Takahashi, Yokohama; Yuji Itoh, Chigasaki, all of Japan

[73] Assignee: Canon Kabushiki Kaisha, Tokyo, Japan

[21] Appl. No.: 31,043

[22] Filed: Mar. 27, 1987

Related U.S. Application Data

[63] Continuation-in-part of Ser. No. 802,317, Nov. 27, 1985, abandoned.

[30] Foreign Application Priority Data

Nov. 30, 1984 [JP] Japan ................................ 59-254438
Nov. 30, 1984 [JP] Japan ................................ 59-254439
Nov. 30, 1984 [JP] Japan ................................ 59-254440
Mar. 28, 1986 [JP] Japan ................................ 61-71977

[51] Int. Cl.$^4$ ........................ G01D 9/42; G01D 15/24
[52] U.S. Cl. ................................... 346/108; 346/138
[58] Field of Search ............. 346/108, 138; 355/3 SH, 355/14 SH

[56] References Cited

U.S. PATENT DOCUMENTS

| | | | |
|---|---|---|---|
| 3,790,159 | 2/1974 | Hatzmann | 346/138 |
| 4,259,695 | 3/1981 | Nakano | 346/138 |
| 4,433,905 | 2/1984 | Haramaki | 355/3 SH |
| 4,516,142 | 5/1985 | Yamamoto | 346/108 |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An image recording apparatus has a feed system for feeding a recording sheet from a feed magazine to a drum, a drum system for winding the recording sheet therearound and rotating to align the recording position with a predetermined position on the circumferential surface of the drum, a scanning system for main-scanning the recording sheet at the recording position of the sheet with an optically modulated beam, and a storage system for storing the recording sheet on which an image has been formed. The drum is rotated in opposite directions during feed and storage of the sheet.

10 Claims, 13 Drawing Sheets

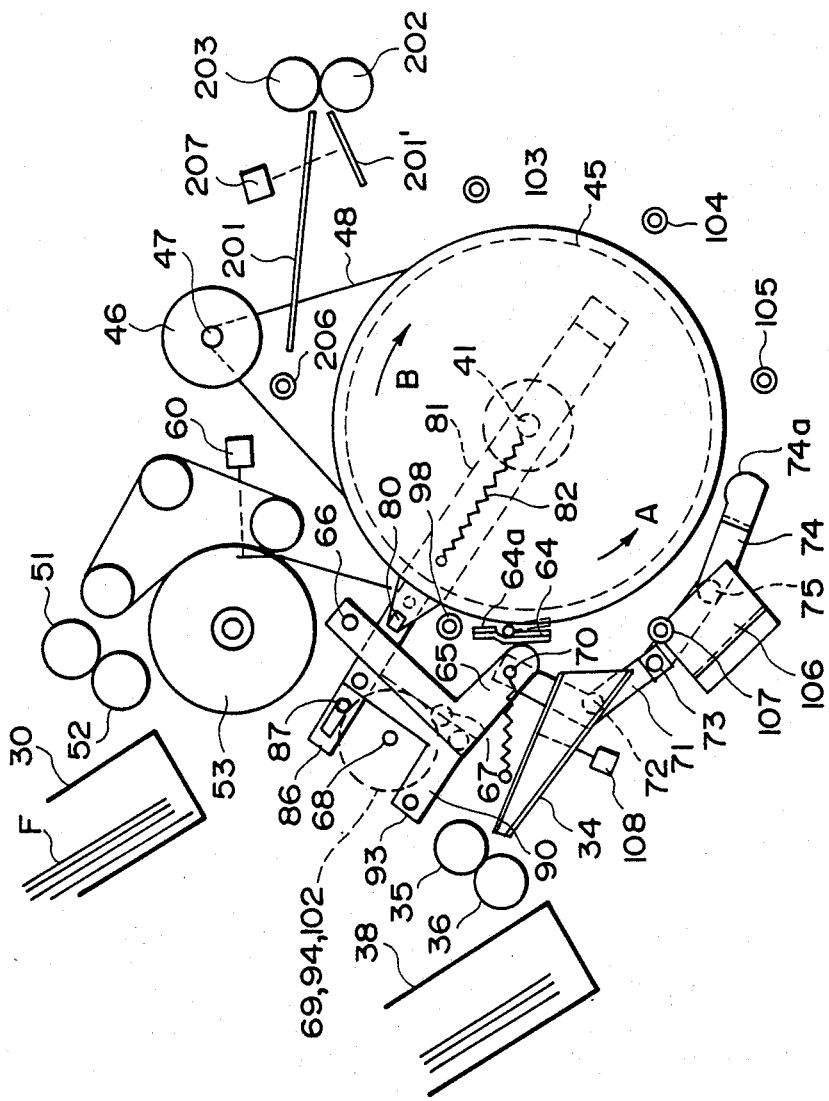
F I G. 15

IMAGE RECORDING APPARATUS WITH IMPROVED SYSTEM FOR FEEDING AND EXHAUSTING RECORDING SHEETS

This is a continuation of Ser. No. 802,317 filed 11/27/85 now abandoned.

BACKGROUND OF THE INVENTION

1. Field of the Invention

The present invention relates to an improvement in an image recording apparatus for recording, with a scanning light beam modulated with an image signal, an image or a multiformat image composed of a plurality of images (e.g. a medical tomographic image using X-rays, ultrasonic light rays, or the like) on a recording sheet disposed on a drum which is rotated such that a direction perpendicular to the scanning direction of the scanning light beam is tangential to the drum.

2. Description of the Prior Art

In a conventional apparatus of the type described above, as shown in FIG. 1, recording sheets S stored in a feed magazine 2 are picked up one by one by a sheet pickup unit 3 and inserted between feed rollers 4. The sheet S is supplied to a drum 1 by the feed rollers 4 through a guide plate 5. The sheet S is driven at a constant speed by bringing it into contact with the drum 1 rotating at a predetermined speed. An image is recorded on the sheet S by laser beam scanning. A laser beam L emitted from a laser light source 6 is modulated by an optical modulator 7 and is main-scanned by a galvano mirror 8. The laser beam L is projected to record on the recording surface of the drum 1 through lens 9 and mirrors 10, 11. The recording sheet S on which the image has thus been recorded is stored in a storage magazine 14 through a guide plate 12 and exhaust rollers 13. The sheet S is then manually carried to a developer by the operator or is directly brought to the developer downstream of the convey path without being stored in the magazine 14. Then, the developer develops the image.

While the image is recorded on the sheet S disposed on the periphery of drum 1, the rear end of the sheet S must be away from the rollers 4 and the front edge of the sheet S must not be clamped between the rollers 13 in order to prevent irregular sheet feed. Assuming that the beam scanning surface including the laser beam line between the recording position on the drum 1 and the mirror 11 is a boundary, the inlet side from this boundary up to the rollers 4 must have a space corresponding to the length of the recording sheet S and the outlet side from this boundary down to the rollers 13 must also have a similar space. Thus, the feed and storage magazines 2 and 14 are opposed to each other at the two sides of the boundary. For this reason, loading/unloading operability of the magazines 2 and 14 is degraded, and the total height or length of the apparatus is increased. In addition, the optical system including the laser light source 6 must be arranged away from the operating portion of the magazines 2 and 14. Then, a complex arrangement must be adopted wherein the optical system crosses the two sides of the boundary. As a technique for winding a recording sheet S around a drum 1, although slightly different from the field of the present invention, a technique in an ink-jet printer as shown in FIG. 2 is disclosed in Japanese patent application laid-open No. 10346/1984. In this specification, a recording sheet S taken out from a feed magazine 2 is wound around the drum 1 through feed rollers 4. The sheet S is rotated with the drum 1 and is recorded by an ink-jet head 15. The recording sheet S on which an image has been recorded in this manner is exhausted by exhaust rollers 13.

In the above-mentioned apparatus, mainscanning is performed by rotation of the drum 1, and subscanning is performed by movement of the ink-jet head 15 along the drum axis. Suppose that the drum rotation mechanism shown in FIG. 2 is applied to the subscanning section shown in FIG. 1. Then a large drum section is not required since the rollers 4 and 13 can be arranged near the drum 1. Since separate rollers are used to feed and exhaust the sheet S to and from the drum, conveyance control is easy. However, in the drum rotation mechanism shown in FIG. 2, the obverse/reverse relationship of the sheet S is opposite when the sheet S is in the feed magazine 2 and in the storage magazine 14.

In case that a silver salt film having an emulsion coated on one surface is used as a recording sheet S, when the film is picked up from the magazine 2 to the drum section or when the storage magazine is loaded in a developer and the film is taken out from the storage magazine to be placed in a developing tank, the suction force of a suction cup, or sucker is normally used. In this case, in order not to allow the suction cup mark to remain on the silver salt film, the emulsion side of the film must face downward in both the feed and storage magazines 2 and 14. However, when the drum rotation mechanism in FIG. 2 of the above-mentioned Japanese patent application is used in a subscanning section of the apparatus as shown in FIG. 1, this requirement cannot be satisfied.

SUMMARY OF THE INVENTION

It is an object of the present invention to provide an image recording apparatus that has overcome the above-mentioned disadvantages of the conventional apparatus having a large height and/or large length and having an inferior operability. The apparatus can effectively utilize available space to provide a compact structure and does not change the obverse/reverse relationship of a recording sheet during feed and exhaust operations of the sheet.

It is another object of the present invention to provide an image recording apparatus which can easily arrange and adjust the optical scanning system.

It is still another object of the present invention to provide an image recording apparatus which can form an image with an excellent operability on recording sheets of various sizes.

BRIEF DESCRIPTION OF THE DRAWINGS

FIGS. 3 to 14 show an embodiment of an image recording apparatus according to the present invention, in which FIG. 3 shows a system configuration, FIG. 4 shows a side view of a drum drive system, FIGS. 5 to 10 are diagrams showing a structure associated with feed and exhaust operations of recording sheets, FIG. 6 particularly showing holding of the sheet front edge, FIG. 7 showing holding of the sheet rear edge, and FIG. 8 showing the writing state, FIG. 12 is a side view, and FIGS. 13 and 14 are timing charts of a detection mechanism and an operation mechanism;

FIG. 15 is an illustrative view showing two storage systems for conveying sheets into a storage magazine and into an automatic developer.

DESCRIPTION OF THE PREFERRED EMBODIMENT

An embodiment of the present invention will be described with reference to FIGS. 3 to 14.

Figure 3:
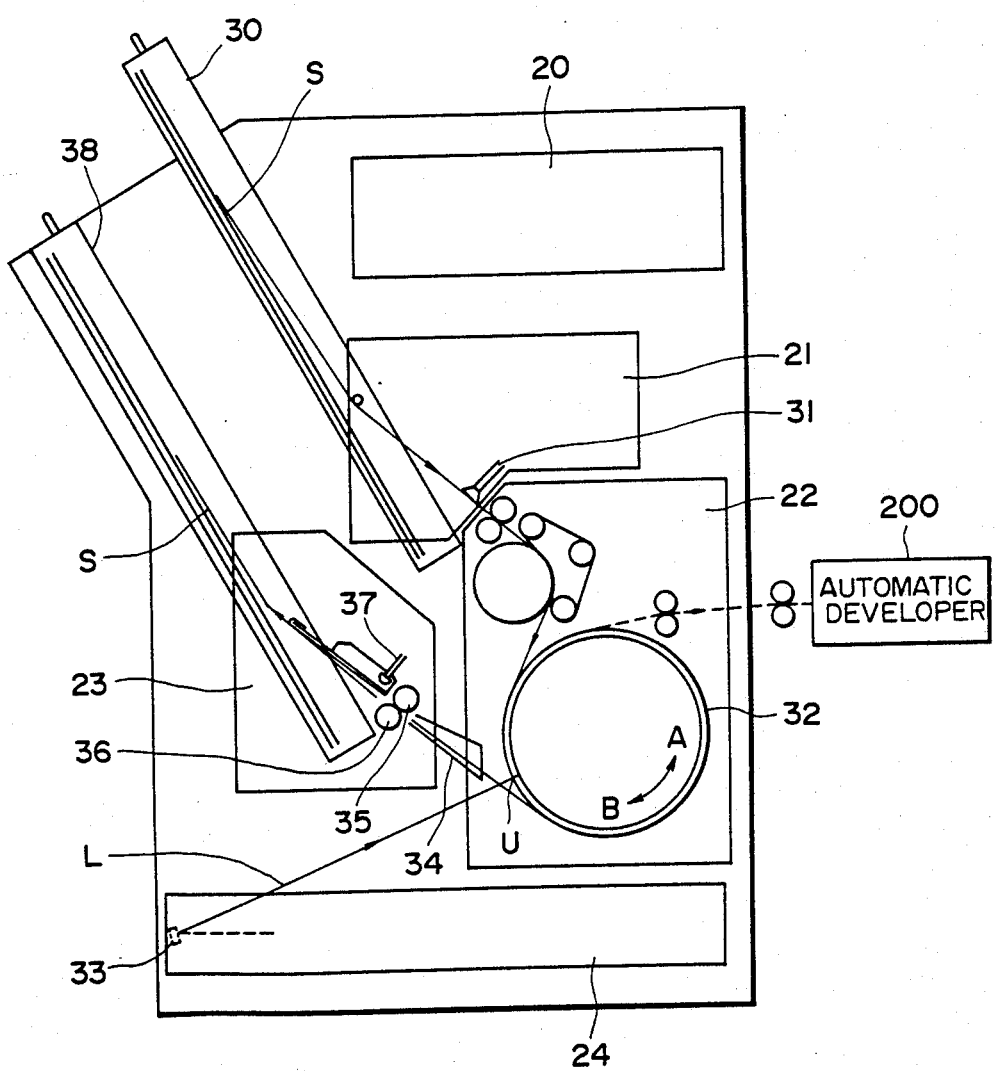

As shown in FIG. 3, the system configuration of the present invention includes a control system 20, a feed system 21, a drum system 22, a storage system 23, and an optical scanning system 24. The control system 20 has a microprocessor and controls the operation of the overall system. The feed system 21 mainly consists of a feed magazine 30 for feeding recording sheets S and a sheet pickup mechanism 31. The drum system 22 mainly has a drum 32 rotatable in A and B directions and performs sheet feed, image writing and exhaust of the recording sheets S. The optical scanning system 24 for recording at recording position U has a laser light source (not shown), a mirror 33, and the like. The storage system 23 has a convey path different from that of the feed system 21 or has a different contact direction of the sheet S with respect to the drum S from that in the system 21. The system 23 has a guide plate 34, exhaust rollers 35 and 36, a sheet pressing mechanism 37, and a storage magazine 38 parallel to the guide plate 30.

When a recording sheet such as a silver salt film is stored in the storage magazine 38, the sheet is developed by an automatic developer. However, as shown by the dotted line in FIG. 3, the recorded sheet can be conveyed from the drum 32 directly to an automatic developer 200. It is important that when the recording sheet S is supplied to the drum 32 and when the sheet S is exhausted therefrom, the drum 32 be rotated in the opposite directions by the control system 20.

It is also important that both the feed and storage systems 21 and 23 be arranged at one side of the scanning surface including the main scanning line of a laser beam L, that is, in the embodiment, both the systems 21 and 23 are arranged above the scanning surface.

Figure 4:
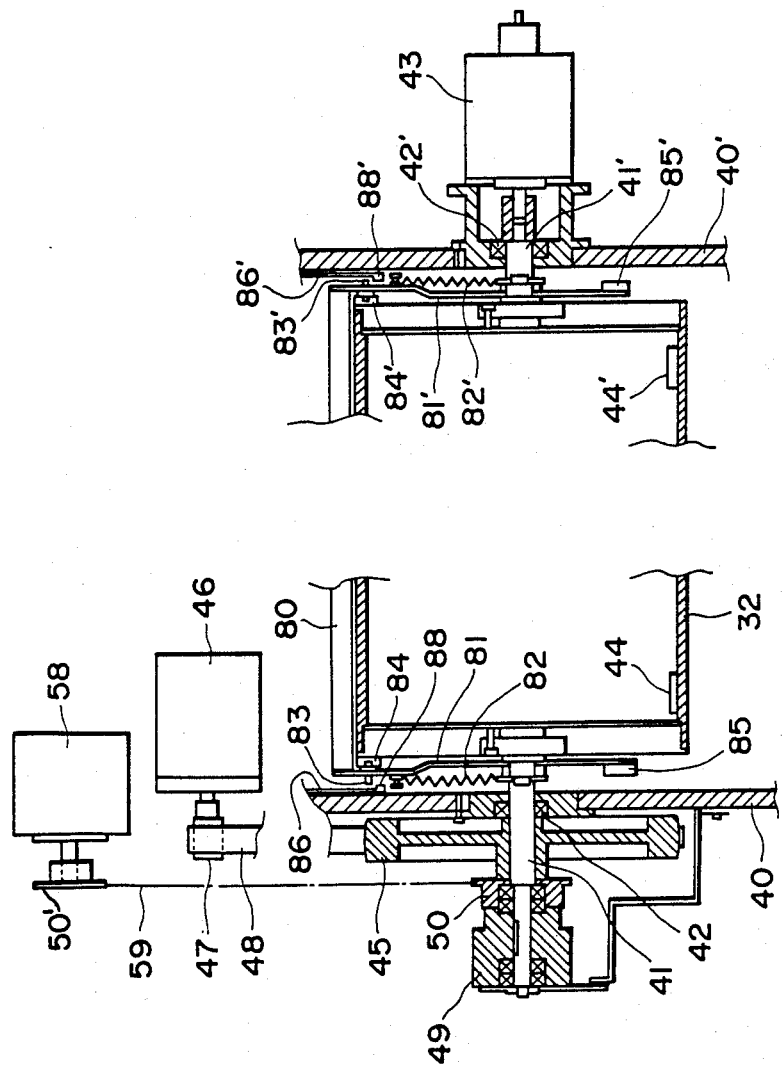
Figure 5:
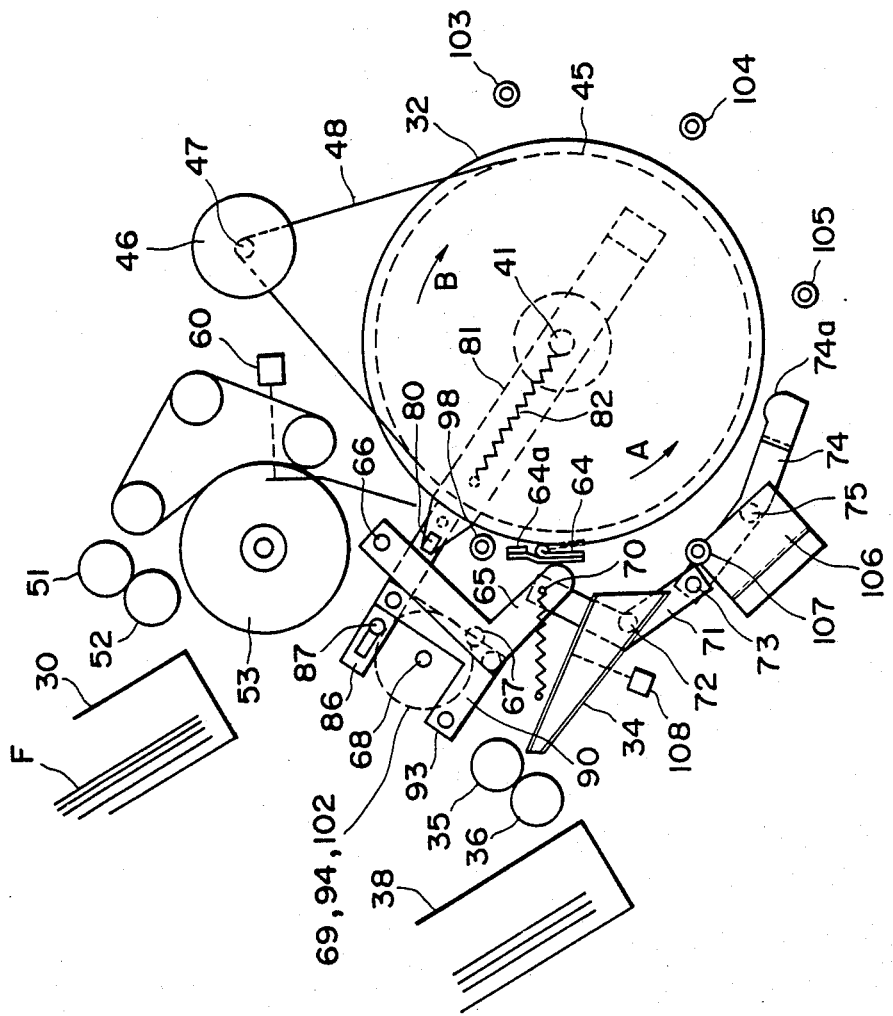

FIG. 4 is a side view of the drum system 22, and FIGS. 5 to 10 show the structure of the feed/exhaust mechanism of the sheet S. The drum 32 is interposed between fixed frames 40 and 40' and is supported rotatably through drum shafts 41, 41' and bearings 42, 42'. An encoder 43 for detecting the position of the drum 32 is supported on the shaft 41'. Balance weights 44 and 44' are mounted on the inner surface of the drum 32. A pulley 45 is fixed to the drum shaft 41. An endless belt 48 is looped between the pulley 45 and a pulley 47 mounted on the drive shaft of a motor 46 for driving the drum for driving the drum for writing. A sprocket 50 is mounted on the drum shaft 41 through a clutch 49. A chain 59 driven by a motor 58 through a sprocket 50' for winding is looped around the sprocket 50 and feed rollers 51, 52 and 53 and exhaust rollers 35 and 36 shown in FIG. 5. When the clutch 49 is turned on, the drum 32 and the rollers 51, 52, 53, 35, 36 are driven by the motor, 58. The tooth numbers of the sprockets 50 and 50' are selected such that these rollers are rotated at the same peripheral speed. A detector 60 for detecting the recording sheet S is arranged at the feed inlet side of the drum 32, as shown in FIG. 5.

Figure 6:
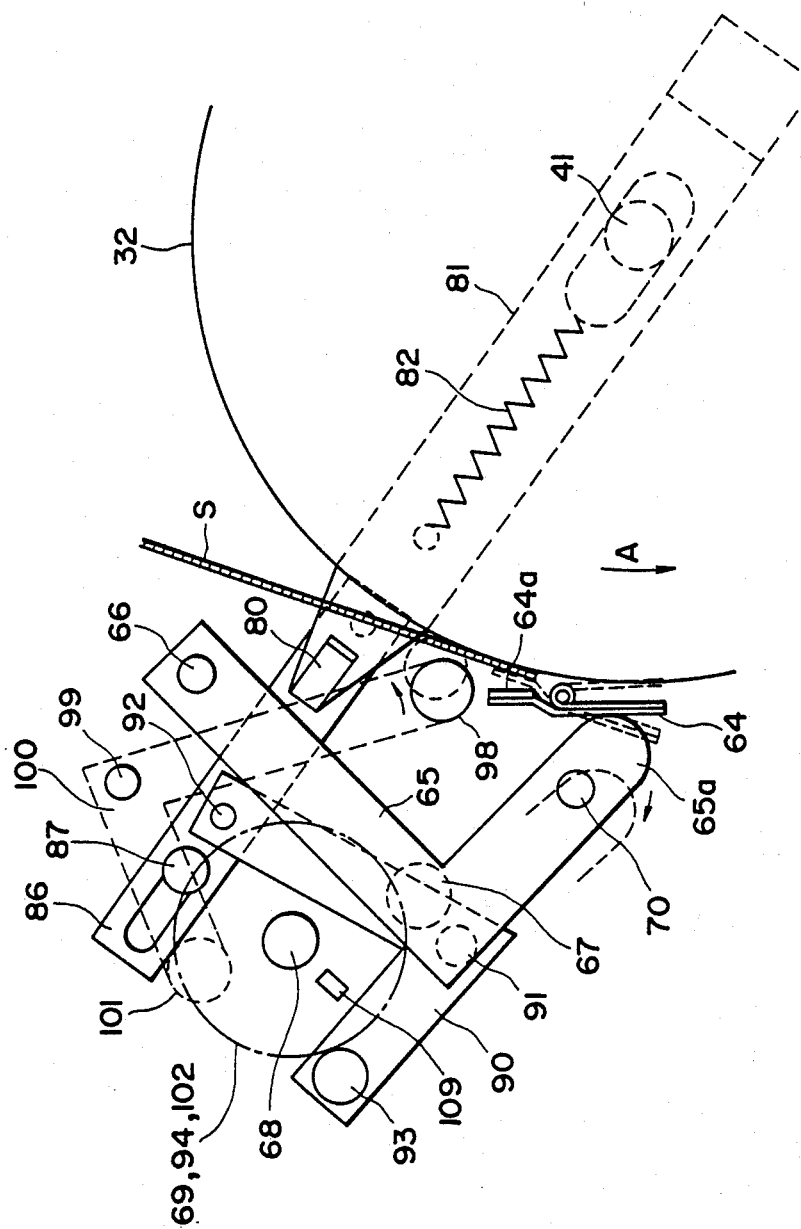

Referring to FIGS. 5 and 6, a front edge chuck member 64 of spring-biased wing type is mounted on the drum 32. The member 64 has a length sufficient to contact across the entire length of the drum 32 therewith. A clamping portion 64a of the member 64 is biased by a spring to the circumferential surface of the drum 32 to clamp the sheet S therebetween. The portion 64a is opened with respect to the surface of the drum 32 at its predetermined position by a front edge open lever 65. The front edge open lever 65 is rotatable about an axis 66. A pressing portion 65a at the front edge of the lever 65 undergoes a predetermined movement by a roller 67 on the lever 65 and a cam 69 on a cam shaft 68. Upon this movement of the pressing portion 65a, the clamping portion 64a is opened.

A shaft 70 is arranged near the pressing portion 65a. A relay lever 71 is supported on the shaft 70 to be pivotal about a shaft 72. The other end of the lever 71 is coupled to a lever 74 through a coupling shaft 73. The lever 74 is pivotal about a shaft 75. A pressing portion 74a of the lever 74 undergoes a similar movement as the pressing portion 65a of the lever 65 as the lever 65 moves.

A rear edge chuck member 80 is arranged at a distance from the drum 32 and to extend along the entire length of the drum 32. The two ends of the member 80 are fixed to rectangular support plates 81 and 81'. The support plates 81, 81' are pivotally supported on the drum shafts 41 and 41' and are slidable in the radial direction of the drum 32. The support plates 81, 81' are biased in the direction toward the drum shafts 41, 41' by springs 82, 82' interposed between the plates 81, 81' and the drum shafts 41, 41'.

As shown in FIG. 4, pins 83, 83' are fixed to the support plates 81, 81'. The distal ends of the pins 83, 83' are received in grooves 84, 84' formed in both side end surfaces of the drum 32. Balance weights 85 and 85' are mounted on the support plates 81 and 81' on which the rear edge chuck member 80 is fixed. The drum 32 can maintain a weight equilibrium during rotation irrespective of the position of the chuck member 80. Slide levers 86, 86' are slidably mounted on the frames 40, 41' through a shaft 87. Flanges 88, 88' are mounted on the distal ends of the slide levers 86, 86'.

A rear edge open lever 90 for actuating the rear edge chuck member 80 is rotatable about a shaft 91. One end of the lever 90 is fitted to a shaft 92 mounted on the levers 86, 86', and a roller 93 is mounted on the other end thereof. The roller 93 is in contact with a cam 94 on the cam shaft 68.

A pressing roller 98 is interposed between the rear edge chuck member 80 and the front edge chuck member 64. The roller 98 has a length to contact to press along the entire length of the drum 32 and is pivotally mounted on one end of a lever 100 which is, in turn, pivotal about a shaft 99. A roller 101 is mounted on the other end of the lever 100, and the roller 101 is in contact with a cam 102 mounted on the cam shaft 68. The lever 100 is biased by a spring in a direction to urge the roller 98 against the circumferential surface of the drum 32.

The roller 98 can be located at three different positions with respect to the circumferential surface of the drum 32 by the cam 92. More specifically, the roller 98 can be set at a first position where it is urged against the circumferential surface of the drum 32 and is closed (Table 1), at a second position at which it is slightly away from the circumferential surface of the drum 32 and is in an intermediate state (Table 1), and at a third position where it is far away from the circumferential surface of the drum 32 and is fully open (Table 1).

TABLE 1

| Front edge chuck member 64 | Rear edge chuck member 80 | Pressing roller 98 |
| --- | --- | --- |
| (a) Open | Open | Intermediate (initial position) |
| (b) Closed | Open | Closed |
| (c) Closed | Closed | Fully closed |
| (d) Closed | Open | Fully open |
| (e) Open | Open | Fully open |
| (f) Closed | Open | Fully open/ intermediate |

Figure 14:
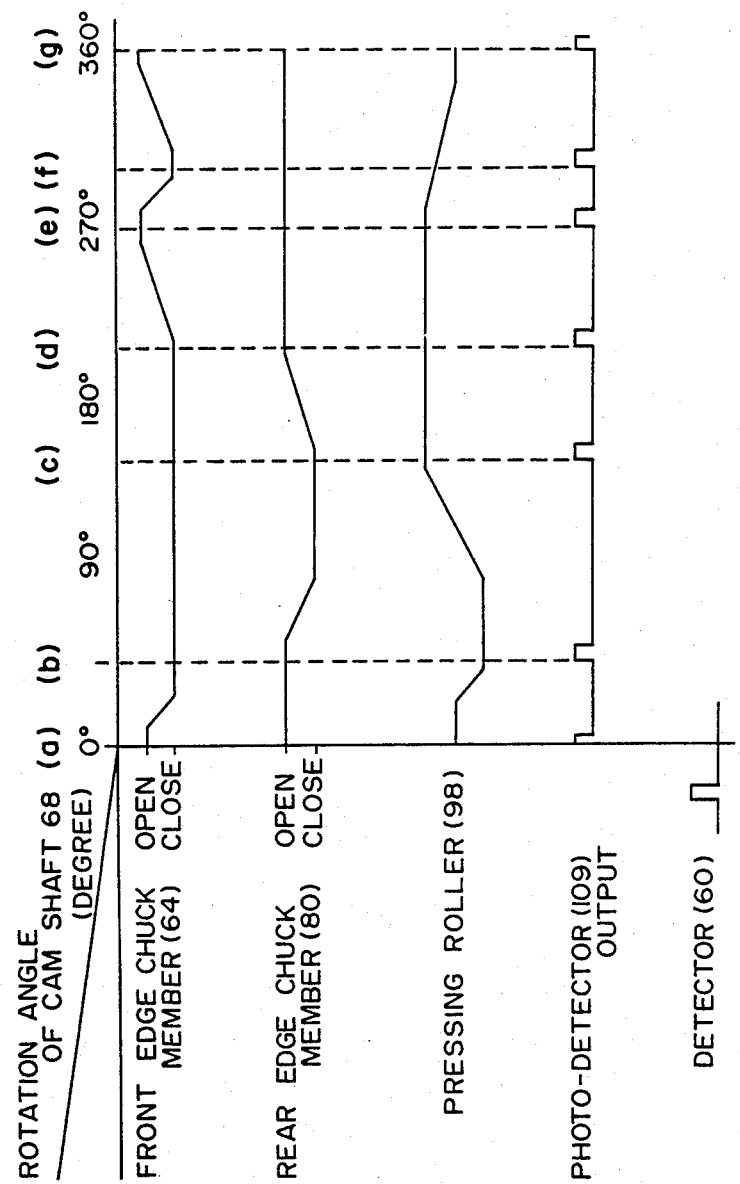
Figure 16:
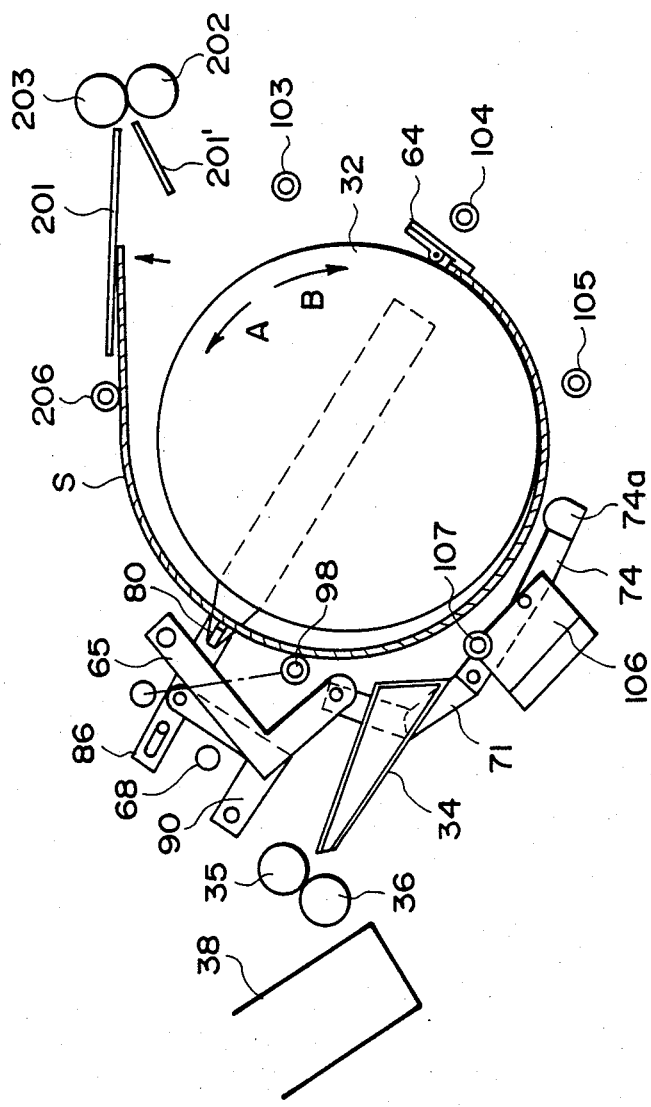
FIGS. 16 and 17 are illustrative views showing a discharge operation of a recording sheet to the automatic developer.

Rotatable pressing rollers 103, 104 and 105 shown in FIG. 5 are supported by the frames 40, 40', and guide plates 34 and 106 for guiding the recording sheet S are fixed to the frames 40, 40'. A rotatable pressing roller 107 is arranged on a guide plate 106, and a detector 108 for detecting the front edge of the stored sheet S is arranged at the distal end of the guide plate 34. A photodetector 109 is arranged near the cam shaft 68 and detects the rotating position thereof, as will be described later. Three cams 69, 94 and 102 and six photochoppers (not shown) are mounted on the cam shaft 68, and the photo-detector 109 produces an output as shown in FIG. 14. Table 1 shows the states (a) to (f) of the front and rear edge chuck members 64, 80 and the roller 98 which are actuated upon rotation of the cam shaft 68.

Figure 11:
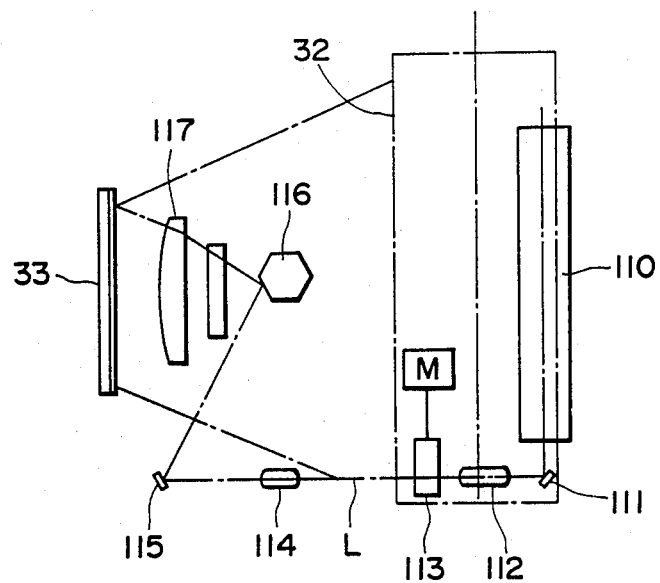
Figure 12:
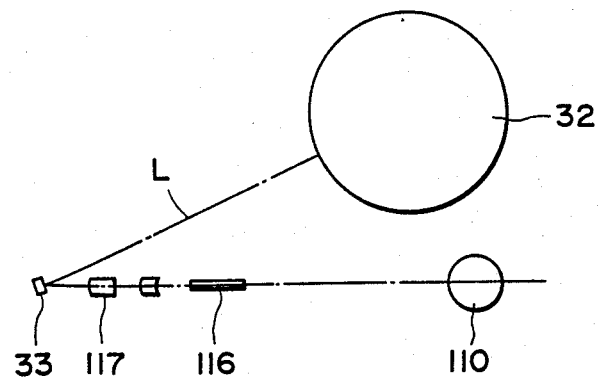

FIGS. 11 and 12 are a plan view and a side view showing the construction of the optical scanning system 24. A laser beam L emitted from a light source 110 is modulated in amplitude by an ultrasonic optical modulator 113 through a mirror 111 and a beam compressor lens 112. The beam reaches a scanning rotary polygonal mirror 116 through a beam expander lens 114 and a mirror 115, and is main-scanned. The beam L then reaches the recording surface of the drum 32 through an f0 lens unit 117 and a mirror 33.

Figure 13:
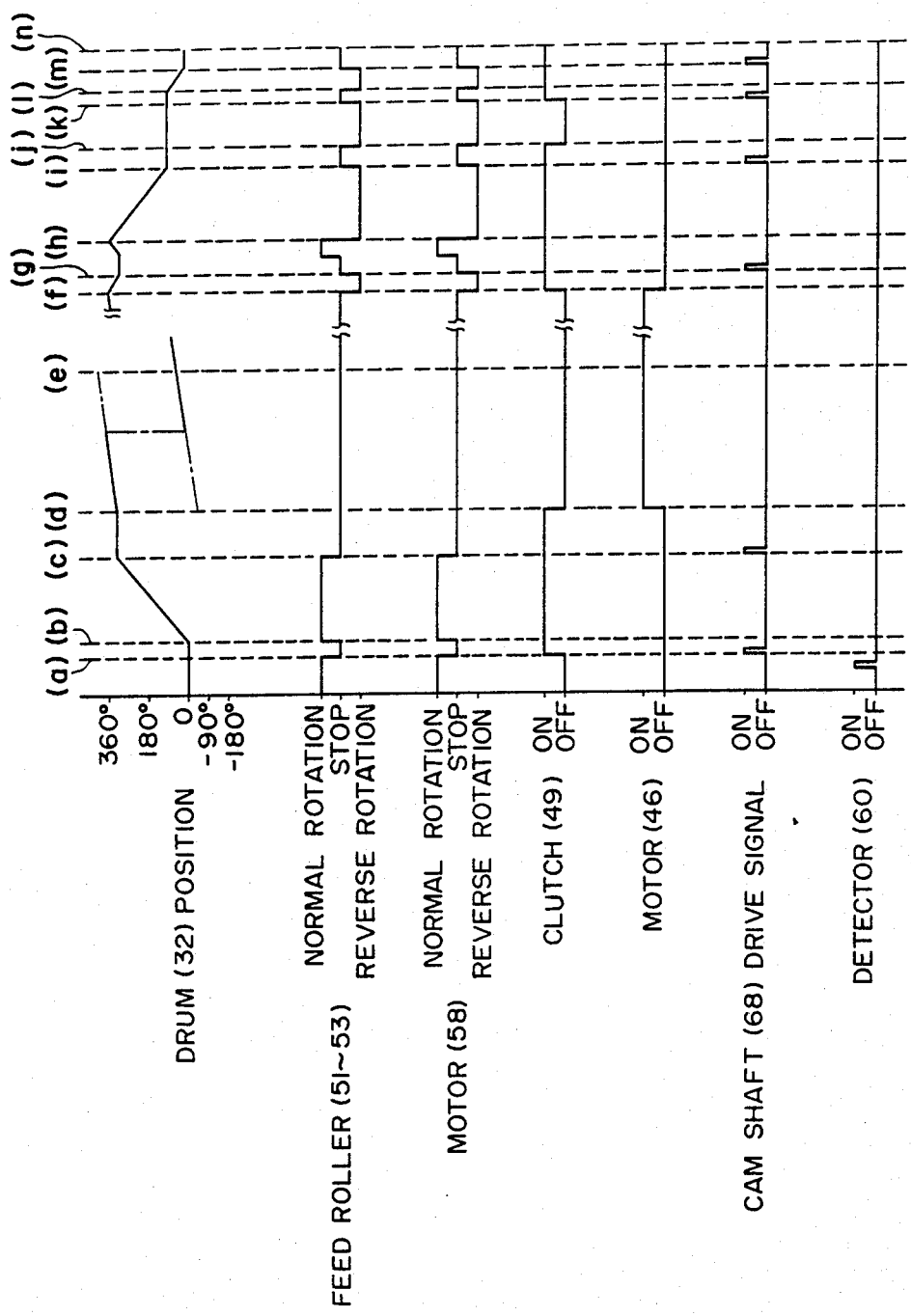

The embodiment of the present invention has the above-mentioned arrangement, and functions in the following manner. FIGS. 13 and 14 show an operation timing of each part of the mechanism. As the initial position, the drum 32 is stopped at a position of an angle 0°. As shown in FIG. 6, the clamping portion 64a of the front edge chuck member 64 is separated from the circumferential surface of the drum 32 by the pressing force of the lever 65 through the cam 69. The slide levers 86 and 86' are moved upward by the cam 94 and the lever 90. The rear edge chuck member 80 is moved upward by the flanges 88, 88' and pins 83, 83' at the distal ends of the levers 86, 86'. In this state, the drum 32 is rotatable independently of the chuck member 80. The roller 98 is stopped at a position slightly away from the circumferential surface of the drum 32 by the lever 100 and winding preparation for the recording sheet S is completed in this state.

The width of the recording sheet S can be any value within the longitudinal dimension of the drum 32. However, in order to allow reliable clamping of the rear edge of the sheet S by the chuck member 80, the length of the sheet S is preliminarily memorized in the control system 22 and the actuating position of the chuck member 80 is determined in accordance with an output from the encoder 43.

Referring to FIG. 3, a single recording sheet S is taken out from the magazine 30 by the sheet pickup mechanism 31 comprising a vacuum suction cup, or sucker. Then, the winding motor 58 shown in FIG. 4 is rotated in the normal direction, and the rollers 51, 52 and 53 are driven through the chain 59. The sheet S is thus supplied to the drum 32. At this time, the clutch 49 is turned off and the drum 32 is stopped at the initial position. Referring to FIG. 5, when the front edge of the sheet S is detected by the detector 60 and reaches the clamping portion 64a of the chuck member 64, the motor 58 is stopped at the state (a) in FIG. 13 and the sheet S is also stopped. When the motor 58 is a stepping motor, the stop timing is controlled by counting a predetermined number of pulses from the detector 60. The cam shaft 68 is rotated from the state (a) shown in FIG. 14 to the state (b) shown in FIG. 14 by a cam shaft drive motor in response to a drive signal. That is, the pressing portion 65a of the open lever 65 is separated from the chuck member 64, and the clamping portion 64a of the chuck member 64 is urged against the circumferential surface of the drum 32 and holds the front edge of the sheet S, as indicated by the dotted line in FIG. 6.

Figure 7:
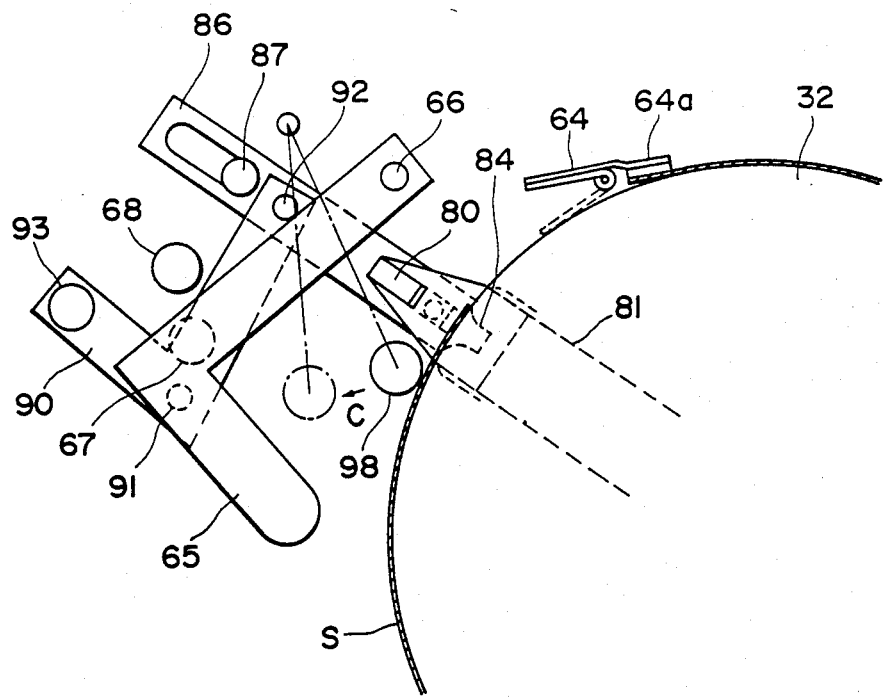

The pressing roller 98 is operated through the lever 100 upon actuation of the cam 102 and presses the sheet S against the circumferential surface of the drum 32. In response to a signal from a photo-detector 109 for detecting the position of the cam shaft 68, the clutch 49 is turned on and the motor 58 starts rotating in the normal direction. The rollers 51, 52, 53, 35 and 36 are rotated, and the drum 32 starts rotating counterclockwise (direction indicated by arrow A) in FIG. 1. Therefore, the sheet S is urged against the drum 32 by the roller 98 as its front edge is chucked by the front edge chuck member 64. The sheet S is thus wound around the drmm 32. When the rear edge of a recording sheet S of a predetermined size preset in the control system 20 reaches a predetermined position, i.e., below the rear edge chuck member 80 as shown in FIG. 7, a signal from the encoder 43 stops the motor 58 at the state (c) in FIG. 13.

The cam shaft 68 is rotated to the position (c) shown in FIG. 13 by a drive command for the cam shaft 68. The rear edge chuck member 80 is urged against the circumferential surface of the drum 32 through the cam 94, the rear edge open lever 90 and the slide lever 86, and chucks the rear edge of the sheet S. The leading ends of the pins 83 and 83' are inserted into the grooves 84 and 84' located at the positions corresponding to the length S of the recording sheet, and the other ends of the pins 83 and 83' are spaced away from the levers 86 and 86'. The pins 83 and 83' can be rotated together with the rear edge chuck member 80 following the drum 32. The pressing roller 98 is largely separated from the circumferential surface of the drum 32 by the cam 102 and the lever 100 as indicated by the arrow C in FIG. 7 to allow the rear edge chuck member 80 urged against the drum 32 to pass through the gap formed between the roller 98 and the drum 32. Thus, the sheet S is wound around the drum 32.

Figure 8:
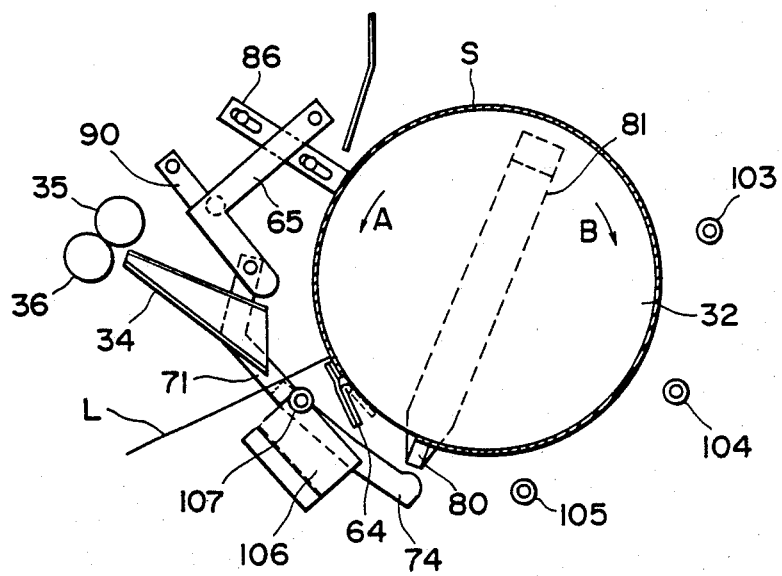

This state corresponds to (d) in FIG. 13. The clutch 49 is turned off, and the motor 46 starts rotating in a direction of arrow A in FIG. 3. When the front edge of the sheet S reaches the write position detected by the encoder 43, i.e., when the mechanical state as shown in FIG. 8 and the operative state (e) as shown in FIG. 13 is obtained, writing or recording on the sheet S is performed by the optical scanning system 24. Recording is performed while the drum 32 is rotated. End of writing is commanded by an encoder position signal indicating a predetermined position of the drum 32 or by an external end signal. In the state (f) shown in FIG. 13, the motor 46 is stopped and the drum 32 is stopped. A series of operations described above are controlled by the control system 20.

The recovery operation of the recorded sheet S will now be described. First, the control system 20 turns on the clutch 49 in the position (f) shown in FIG. 13. The motor 58 is rotated in the reverse direction and the drum 32 is rotated clockwise (in a direction indicated by arrow B) in FIG. 3 to the state (g) shown in FIG. 13. When the drum 32 is rotated to this position or when the positional relationship shown in FIG. 7 is obtained, the cam shaft 68 is rotated to the position (d) shown in FIG. 14 by a cam drive signal. The cam 94 and lever 90 are actuated and the rear edge chuck member 80 is separated from the circumferential surface of the drum 32 to release the rear edge of the sheet S.

Figure 1:
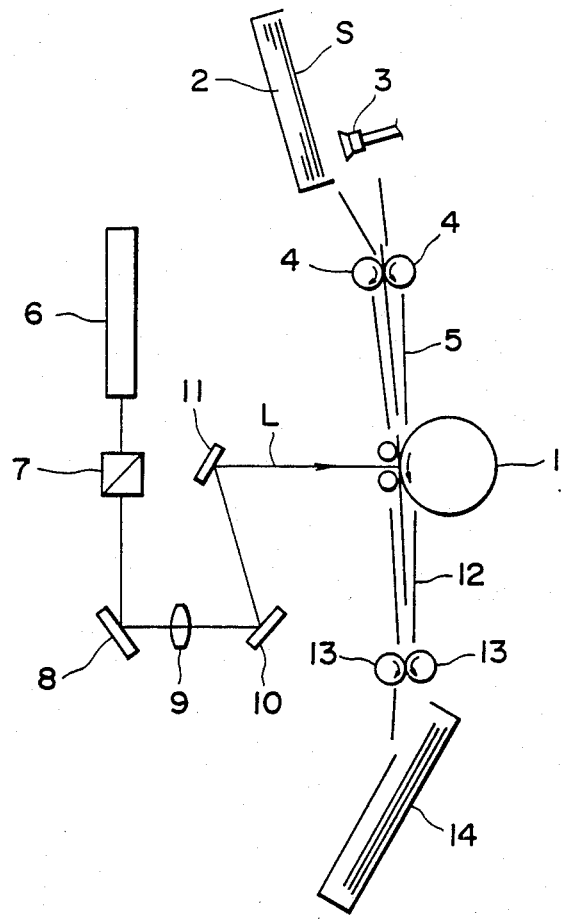
FIGS. 1 and 2 diagramatically show conventional apparatuses.
Figure 2:
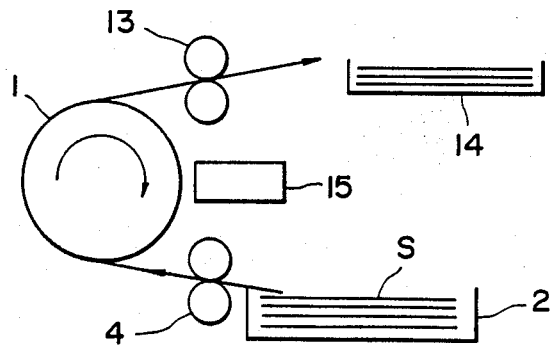
Figure 9:
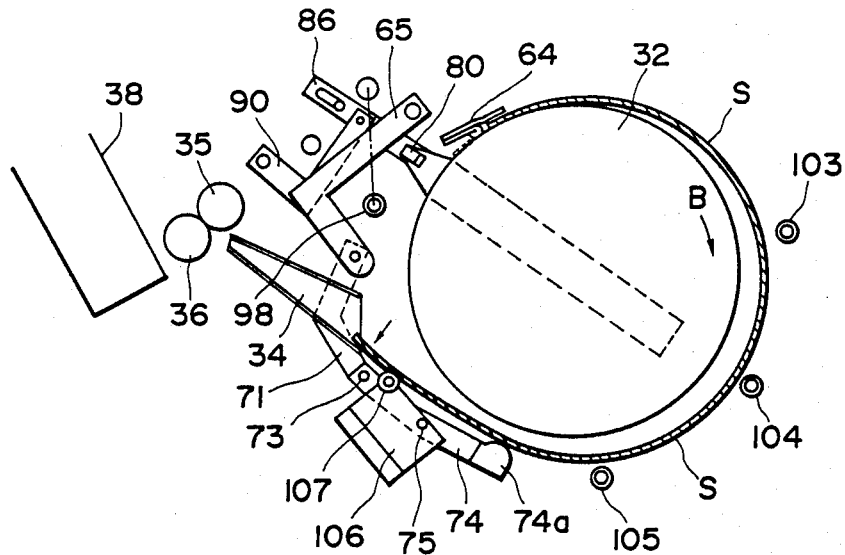
Figure 10:
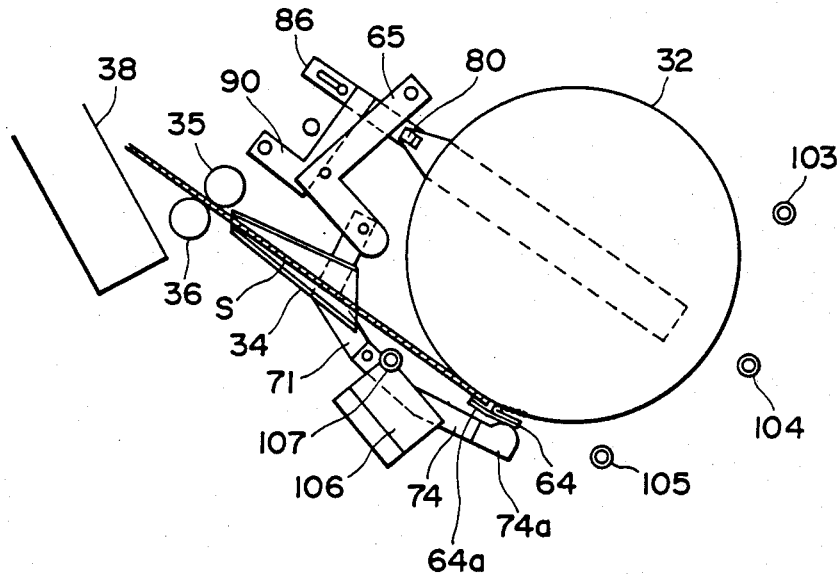

When the motor 58 rotates the drum 32 counterclockwise (in the direction indicated by arrow A) in FIG. 1 to the state (h) shown in FIG. 13 in response to the signal from the photo-detector 109, the rear edge of the sheet S is directed to the guide plate 34 by its elastic recovering force, as shown in FIG. 9. Then the rear edge of the sheet S is guided into the guide plate 34 by the front edge chuck member 64. The rear edge of the sheet S is then clamped between the rollers 35 and 36 rotating at the same peripheral speed as the drum 32 and is exhausted into the storage magazine 38.

The rotatable pressing rollers 103, 104, 105 and 107 prevent loosening of the sheet S so as to smoothly change the curved state of the sheet S into a straight state. When the front edge chuck member 64 reaches the state (i) shown in FIG. 13, or state shown in FIG. 10, the motor 58 is stopped and the drum 32 is also stopped. The cam 6 is driven to the state (e) shown in FIG. 13 in response to a drive command for the cam shaft 68. The clamping portion 64a of the front edge chuck member 64 is released from the circumferential surface of the drum through the cam 69, lever 65, lever 71, lever 74, and pressing portion 74a. The sheet S is thus separated from the drum 32.

The motor 58 is rotated in the normal direction by a signal supplied from the photo-detector 109 at the state (e) in FIG. 14. The motor 58 drives the rollers 35 and 36 to discharge the sheet S into the storage magazine 38. At this time, the clutch 25 is off, and the drum 32 is stopped. When the sheet S is stored in the storage magazine 38, the cam shaft 68 is rotated to the state (f) shown in FIG. 14 and the front edge chuck member 64 is released from the pressing portion 74a of the lever 74. Then, the motor 58 is rotated by a signal supplied from the photodetector 109 at the state (f) in FIG. 14. The clutch 25 is turned on, and the drum 32 is rotated in the direction of arrow B in FIG. 3 and returns to the initial position at the state (m) in FIG. 13. In response to a drive signal for the cam shaft 68, the cam shaft 68 is driven to the initial position (a) in FIG. 14, and the front edge chuck member 64, the pressing roller 98, and the rear edge chuck member 80 are set at the initial state, thereby completing the entire operation.

In this manner, when a recording sheet S of a different length is used, the operation position of the rear edge chuck member 80 can be controlled by an electrical signal, i.e., by the encoder 43 and the control system 20. Therefore, recording sheets S of various sizes can be used for image formation without any problems.

There will be below described a storage operation of recording sheet to the automatic developer 200.

A storage system as shown in FIG. 15 includes a storage system directed towards the automatic developer in addition to the storage system as shown in FIG. 5. In details, there are additionally arranged rotatable press roller 206, guide plates 201, 201', discharge rollers 202, 203 and detector 207 for detecting a front edge or a rear edge of a recording sheet S upon storing the recording sheet.

The storage operation to the automatic developer is started by releasing the rear edge of the recording sheet as explained above in reference to FIG. 7. Then the drum 32 is rotated by the winding motor 58 in accordance with a signal from the photo-detector 109 (FIG. 6) up to a predetermined location in the direction of the arrow A, so that the rear edge of the recording sheet S is directed in a direction of the guide plate 201 due to its resilient restoring force. The predetermined location is detected by the encoder 43 as shown in FIG. 4. In this drum position, the cam shaft 68 is rotated to the position (f) of FIG. 13 in accordance with the cam drive signal so as to move the pressing roller 98 to a half-way position to the drum. This movement bringing the pressing roller 98 near the drum prevents the recording sheet S from swelling out after being released from the drum 32 so as to strengthen resiliency of the recording sheet. In addition, this movement prevents the recording sheet from being scratched by the guide plates, levers or other elements neighboring the pressing roller 98.

Figure 17:
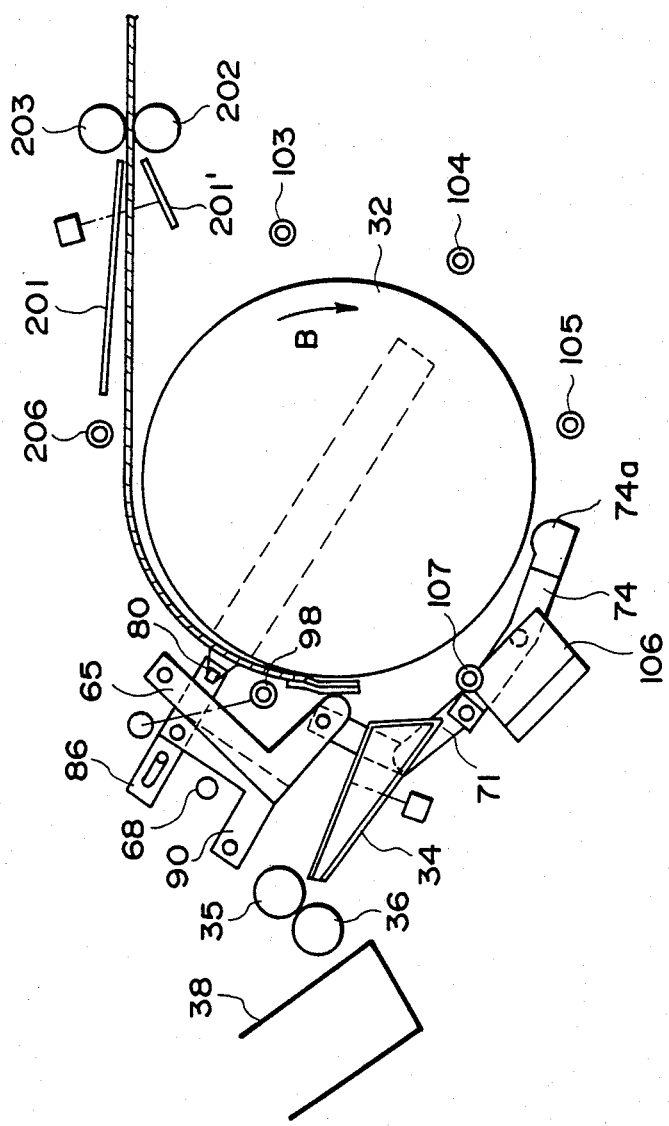

In the following, the drum is rotated in the direction of the arrow B, and thereby the rear edge of the recording sheet S is forwarded between the guides 201, 201' by the front edge chuck member 64. And further the recording sheet is brought to a position where the sheet is pinched by the discharge rollers 202, 203 rotating at the same speed as the periphery of the drum 32. The pinched recording sheet is then conveyed to the automatic developer 200. When the front edge chuck member 64 on the drum 32 reaches the initial position as shown in FIG. 17, the winding motor 58 is stopped, thus stopping the rollers 202, 203 and the drum 32 in turn. Then the cam shaft 68 is rotated to the condition (g) or initial condition as shown in FIG. 13, based on a drive command. At this condition, the clamping portion 64a of the chuck member 64 is caused to leave the periphery of the drum 32 by the front edge open lever 65, resulting in releasing the recording sheet S from the drum 32. After the release, the winding motor 58 starts being rotated by the signal of the photo-detector 109, so that the discharge rollers 202, 203 are driven to convey the recording sheet into the automatic developer 200. During this conveyance, since the clutch 49 as shown in FIG. 4 is off, the drum 32 is kept stationary. And the front edge chuck member 64, the pressing roller 98 and rear edge chuck member 80 are in the initial condition. When the recording sheet has left the discharge rollers 202, 203 and been transmitted to the automatic developer 200, the storage operation is completed.

Two storage systems have been explained above, one of which is the storage system for directing sheets into the storage magazine 38 and the other of which is the storage system for directing sheets into the automatic developer 200. In an alternative, both storage systems can be storage magazines so that one storage system is a magazine for development, in which recording sheets to be quickly developed are stored, and the other is a magazine for storage, in which recording sheets to be later developed en bloc after storage are stored. In a further arrangement, a third storage system provided with another conveyance path of guide plates and discharge rollers may be added to the apparatus in addition to the above-described two storage systems.

In the optical scanning system 24, as shown in FIGS. 11 and 12, the laser beam L emitted from the laser light source 110 is changed in direction by the mirror 111, and converged by the beam compressor lens 112. The beam L is modulated in accordance with recording image information by the ultrasonic optical modulator 113 connected to an image frame memory M storing image information. The beam L then become incident on the rotary polygonal mirror 116 through the lens 114 and mirror 115. The mirror 116 performs main-scanning of the beam L in a direction perpendicular to the moving direction of the sheet S. An image is formed on the sheet S on the drum 32 through the lens unit 117 and the mirror 33. The drum 32 is rotated to sub-scan the sheet S in a direction perpendicular to the main-scanning direction of the beam L.

When the drum system 22 and the optical scanning system 24 are arranged to provide the positional relationship shown in FIG. 3, the laser light source 110, the mirrors 111, 106 and 109, the lens elements 112, 114 and 117, the mirror 116 and the modulator 113 of the optical scanning system 24 can be adjusted within a single plane, so that adjustment of the optical system ma be remarkably facilitated.

Since the feed system 21 and storage system 23 are arranged at one side with respect to the optical beam scanning surface, the arrangement of the optical scanning system 24 can be designed independently of that of the feed system 21 and the storage system 23.

What is claimed is:

1. An image recording apparatus comprising:
    a feed system for picking up a recording sheet from a predetermined position and feeding the picked-up recording sheet;
    a drum system, including a drum, for receiving the recording sheet fed by said feed system, for winding the recording sheet around said drum, and for rotating said drum to record an image on the sheet at a recording position, thereby performing sub-scanning;
    a scanning system for main-scanning the recording sheet at the recording position with the optically modulated light beam;
    a first storage system for storing the recording sheet on which an image has been recorded and which is discharged in a first direction from said drum;
    a second storage system for storing the recording sheet on which an image has been recorded and which is discharged in a second direction different from the first direction from said drum; and
    a control system for rotating said drum in opposite directions during feed of a recording sheet thereto by said feed system and storage of the recording sheet in a selected one of said first and second storage systems.

2. An apparatus according to claim 1, wherein said first and second storage systems respectively are a storage magazine and an automatic developer.

3. An apparatus according to claim 1, wherein a rear edge of the recording sheet is released from said drum at a constant position on a periphery of said drum irrespective of which of the first and the second storage systems is selected by said control system, and thereafter said drum is rotated to a position corresponding to the selected one of said first and second storage systems in order to store the recording sheet therein.

4. An apparatus according to claim 3, wherein the direction of rotation of said drum before the release of the rear edge of the recording sheet is opposite to the direction of rotation thereof after the release for storage of the recording sheet.

5. An apparatus according to claim 3, further comprising an encoder for detecting the position of the drum during rotation thereof.

6. An apparatus according to claim 1, further comprising means for conveying the recording sheet along different paths during the feed and storage operations.

7. An apparatus according to claim 6, wherein the recording sheet is wound on said drum in different directions during the feed and storage operations.

8. An apparatus according to claim 1, further comprising front and rear edge chuck members for securing the recording sheet to be wound around a circumferential surface of said drum, said front edge chuck member securing a front edge of the recording sheet at a predetermined position on the curcumferential surface of said drum when it is in a stopped state, said drum thereafter being rotated by said control system, and said rear edge chuck member securing a rear edge of the recording sheet at a time corresponding to the length of the recording sheet under the control of said control system.

9. An apparatus according to claim 8, wherein said rear edge chuck member is balanced for rotation with said drum.

10. An image recording apparatus comprising:
    a feed system for picking up a recording sheet from a predetermined position and feeding the picked-up recording sheet;
    a drum system, including a drum, for receiving the recording sheet fed by said feed system, for winding the recording sheet around said drum, and for rotating said drum to record an image on the sheet at a recording position thereby performing sub-scanning;
    a scanning system for main-scanning the recording sheet at the recording position with an optically modulated light beam;
    a first storage system for storing the recording sheet on which an image has been recorded and which is discharged in a first direction from said drum;
    a second storage system for storing the recording sheet on which an image has been recorded and which is discharged in a second direction different from said first direction from said drum; and
    a control system for controlling storage of the recording sheet in a selected one said first and second storage systems.

* * * * *

UNITED STATES PATENT AND TRADEMARK OFFICE
CERTIFICATE OF CORRECTION

PATENT NO. : 4,796,035
DATED : January 3, 1989
INVENTOR(S) : KEIICHI KAWASAKI, ET AL.

It is certified that error appears in the above-identified patent and that said Letters Patent is hereby corrected as shown below:

Column 3, line 57, "for driving the drum" should be deleted.

Column 5, line 39, "f0" should read --f$\theta$--.

Column 9, line 28, "ma" should read --may--.

Signed and Sealed this

Second Day of May, 1989

Attest:

DONALD J. QUIGG

Attesting Officer

Commissioner of Patents and Trademarks